United States Patent [19]

Hayakawa et al.

[11] Patent Number: 4,782,357
[45] Date of Patent: Nov. 1, 1988

[54] LIGHT MEASURING DEVICE FOR CAMERA

[75] Inventors: Shingo Hayakawa; Shuichi Kiyohara, both of Kanagawa, Japan

[73] Assignee: Canon Kabushiki Kaisha, Tokyo, Japan

[21] Appl. No.: 43,935

[22] Filed: Apr. 29, 1987

[30] Foreign Application Priority Data

May 8, 1986 [JP] Japan .................... 61-106005

[51] Int. Cl.$^4$ ............................................. G03B 15/05
[52] U.S. Cl. ...................................... 354/414; 354/432
[58] Field of Search ............... 354/413, 414, 429, 431, 354/432

[56] References Cited

U.S. PATENT DOCUMENTS

| | | | |
|---|---|---|---|
| 4,429,969 | 2/1984 | Saegusa ............................... | 354/414 |
| 4,445,778 | 5/1984 | Nakauchi ............................. | 354/432 |
| 4,476,383 | 10/1984 | Fukuhava et al. .................. | 354/432 |
| 4,561,752 | 12/1985 | Miyamoto et al. ................. | 354/432 |
| 4,566,775 | 1/1986 | Tsunekawa ......................... | 354/432 |

Primary Examiner—Russell E. Adams
Attorney, Agent, or Firm—Robin, Blecker & Daley

[57] ABSTRACT

A light measuring device for a camera comprises a light receiving circuit having a plurality of light receiving portions for seeking an area brightness information of each of at least two areas into which the field of view is divided, including a central area located at a center of the field of view and an outer area located outside of the central area, a discrimination circuit for discriminating whether or not the camera has been set in the fill-in flash mode, and a computing circuit for seeking a measuring light value by a computation formula including at least one brightness information out of the plurality of brightness informations sought by the light receiving circuit as a function, the computing circuit performing the light value computation with a weight on the area brightness information of the outer area when the setting of a flash exposure in the fill-in flash mode has been discriminated by the discriminating circuit.

5 Claims, 4 Drawing Sheets

LIGHT MEASURING DEVICE FOR CAMERA

BACKGROUND OF THE INVENTION

1. Field of the Invention

This invention relates to a light measuring device for a camera of the type in which the field of view of the finder is divided into a plurality of areas, and brightness informations are sought over all these areas and are computed based on various formulae to obtain a light value.

2. Description of the Related Art

As a photographic technique of the camera there is known photography by the fill-in flash mode.

From the first, the fill-in flash mode is selected when such a photographic situation is encountered that, as with back lighting, the difference between the brightness of a subject of principal interest and its background is so large that it is difficult to give a proper exposure to both of the subject and background areas of film. In other words, this case is such a scene that if the exposure is made proper for the subject area by using the spot light measuring mode, the background area of high brightness is considerably over-exposed, and if it is attempted to give the proper exposure to the entire area of the picture frame by the center-weighted average light measuring, the subject area of relatively low brightness is caused to be considerably under-exposed. The fill-in flash mode in the case of such a scene is to illuminate the subject arranged at a relatively short distance with flash light so that while the proper exposure is given to the background area, the subject area does not become under-exposed.

Since the fill-in flash mode has its aim in what has been described above, in the past, many have been so constructed that when this mode is selected, the exposure is determined by the average light measuring or the center-weighted average light measuring which is relatively liable to give a proper exposure to the background area. But, because this kind of light measuring mode has sensitivity over the entire area of the picture frame, it is susceptible to the influence of the brightness of the subject which is relatively low as compared with the brightness of the background. Hence, there has been a drawback that the background area of the film is liable to be over-exposed. Particularly when the proportion of the subject area in the picture frame was large, this influence was conspicuously exerted with the result of the over-exposure.

SUMMARY OF THE INVENTION

An object of the invention is to provide a light measuring device suited to the assumption that a subject of principal photographic interest lies at the center of the field of view, in which particularly when the fill-in flash mode is selected, the light measuring outputs of the marginal areas of the picture frame are utilized in weighted relation to give a proper exposure to the background area.

DETAILED DESCRIPTION OF THE PREFERRED EMBODIMENT

Figure 1:
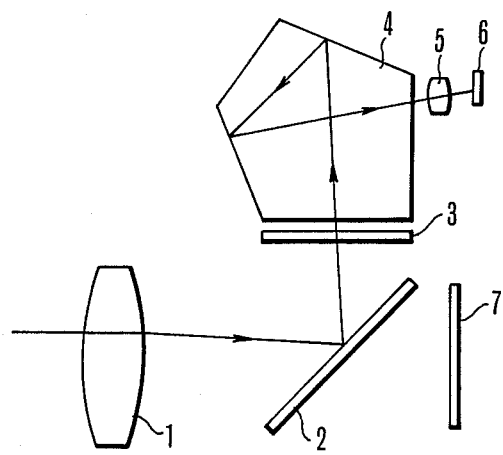
FIG. 1 is a schematic view of an optical system as an embodiment of the invention applied to the single lens reflex camera.

In FIG. 1, the optical system of the single lens reflex camera includes a photographic lens 1, a quick return mirror 2, a focusing screen 3, a pentagonal prism 4, an image forming lens 5 and a light sensor 6. 7 is an image plane (film plane).

In the embodiment of the invention, the light measuring is performed in such a way that the light rays from an object image formed on the focusing screen 3 by the photographic lens 1 are conducted to and focused on the light sensor 6 by the image forming lens 5.

Figure 2:
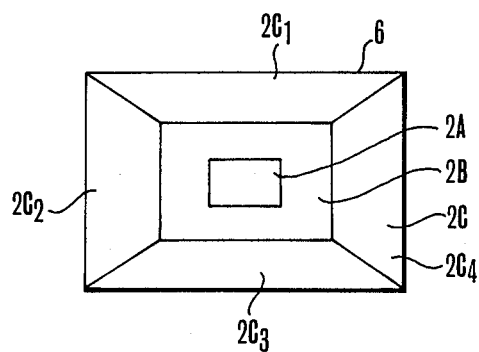
FIG. 2 is a schematic plan view illustrating a plurality of light measuring areas in the light receiving surface of the photo-sensitive means of FIG. 1.

FIG. 2 is a diagram taken to explain the light receiving surface of the light sensor 6 shown in FIG. 1. In FIG. 2, 2A is an area of an almost cental portion of the field of view of the finder; 2B is another area of an intermediate portion of a shape which surrounds the periphery of the area 2A; and 2C is another area of a marginal portion of a shape which surrounds the periphery of the area 2B. The area 2C is divided into four parts $2C_1$–$2C_4$. In the embodiment of the invention, a plurality of photosensitive elements capable of receiving the light of the areas of the field of view of the corresponding positions to all the areas as shown in FIG. 2 are arranged so that the field of view is divided into the six areas 2A, 2B, $2C_1$–$2C_4$ and the light measuring of the brightness of the field of view is performed in each area.

Figure 3:
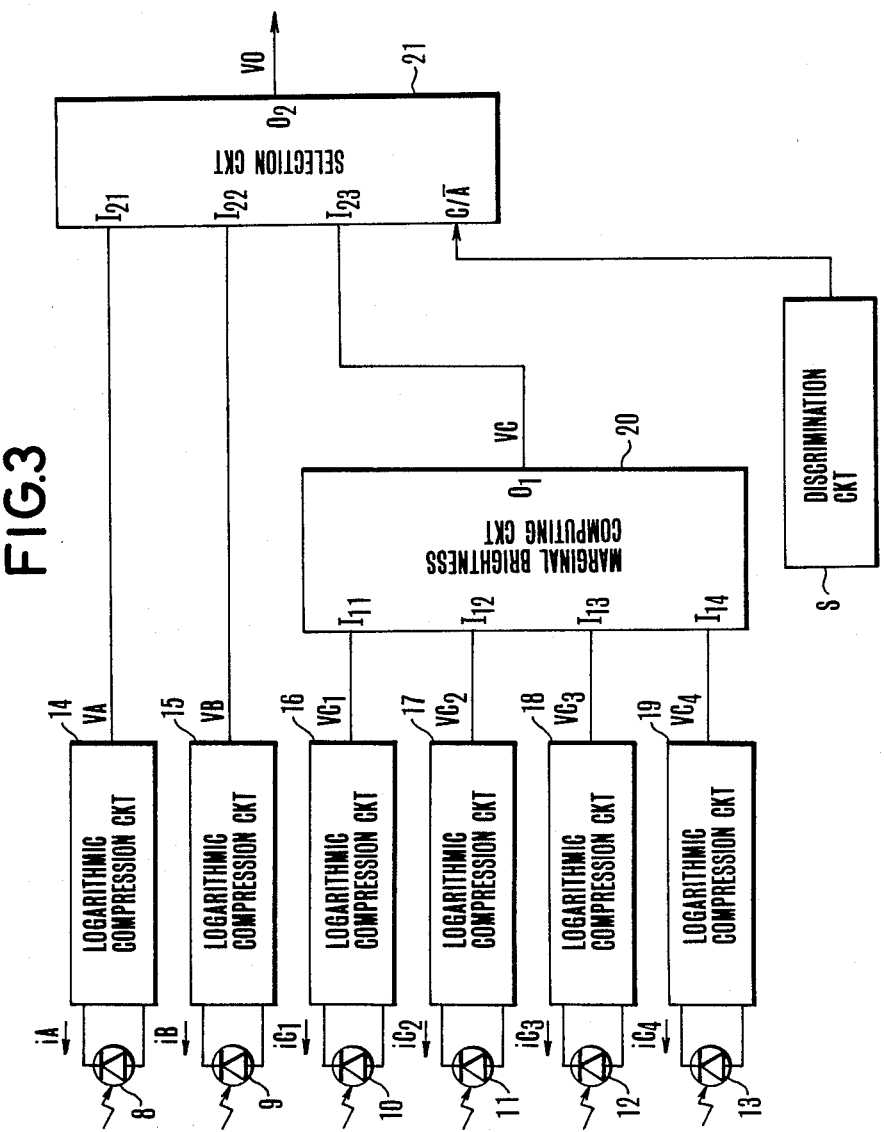
FIG. 3 is an electrical circuit diagram of the light measuring device.
Figure 4:
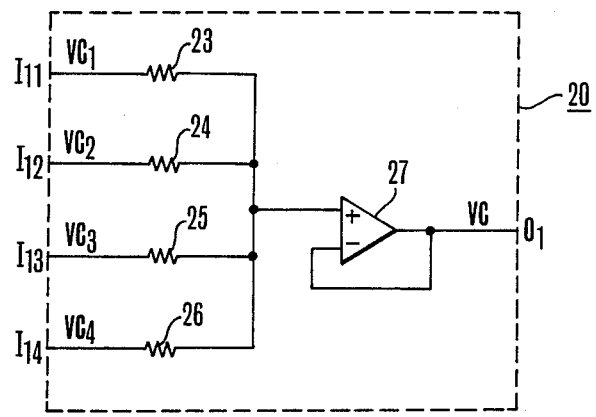
FIG. 4 is an electrical circuit diagram of the details of the marginal brightness computing circuit of FIG. 3.
Figure 5:
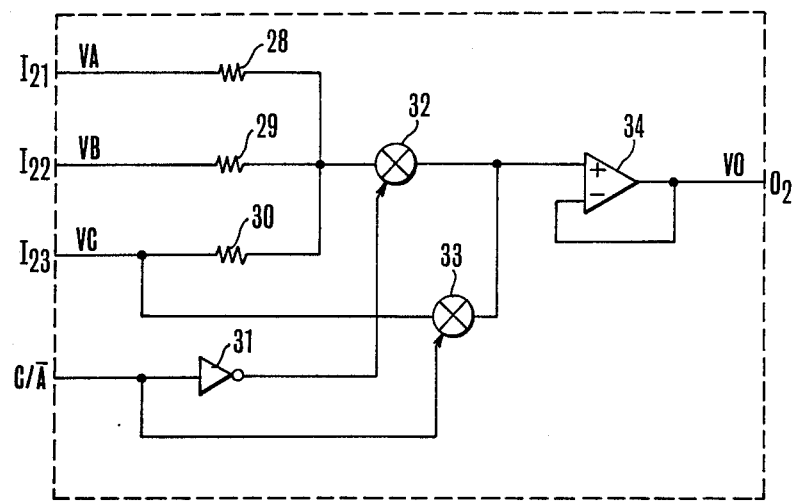
FIG. 5 is an electrical circuit diagram of the details of a selection circuit of FIG. 3.

FIG. 3 to FIG. 5 are electrical circuit diagrams taken to explain the circuit structure of the invention.

In FIG. 3, silicon photo-diodes (SPDs) 8, 9, 10, 11, 12, 13 correspond to the above-described six areas 2A, 2B, $2C_1$, $2C_2$, $2C_3$, $2C_4$ and generate photo-currents iA, iB, $iC_1$, $iC_2$, $iC_3$, $iC_4$ of intensities proportional to the brightnesses of the respective areas. Logarithmic compression circuits 14–19 logarithmically compress these photo-currents and produce outputs of voltage values VA, VB, $VC_1$, $VC_2$, $VC_3$, $VC_4$. The voltages VA, VB, $VC_1$, $VC_2$, $VC_3$, $VC_4$ are expressed by using constants $a_1$, $a_2$, $a_3$, $a_4$, $a_5$ $a_6$ ($\geq 0$), b ($>0$) and the photo currents iA, iB, $iC_1$, $iC_2$, $iC_3$, $iC_4$ as follows:

$$VA = a_1 + b \log iA$$

$$VB = a_2 + b \log iB$$

$$VC_1 = a_3 + b \log iC_1$$

$$VC_2 = a_4 + b \log iC_2$$

$$VC_3 = a_5 + b \log iC_3$$

$$VC_4 = a_6 + b \log iC_4$$

where $a_1$, $a_2$, $a_3$, $a_4$, $a_5$ and $a_6$ are previously determined in the logarithmic compression circuits 14–19 so that when the brightnesses of all the areas are equal to one another, $VA = VB = VC_1 = VC_2 = VC_3 = VC_4$ results. A marginal brightness computing circuit 20 receives the output voltages $VC_1$, $VC_2$, $VC_3$, $VC_4$ of the logarithmic compression circuits 16–19 at input terminals $I_{11}$, $I_{12}$, $I_{13}$, $I_{14}$ respectively, computes a brightness value of the most marginal portion 2C of the field of view, and produces a voltage VC at an output terminal $O_1$. The construction of this marginal brightness computing circuit 20 is shown in FIG. 4.

In FIG. 4, resistors 23, 24, 25, 26 have the same resistance value and constitute a circuit for averaging the voltages $VC_1$, $VC_2$, $VC_3$, $VC_4$. An operational amplifier 27 with its output terminal and inverting input terminal connected to each other is used as a voltage follower. From the output terminal of the operational amplifier 27 is produced a voltage equal to the voltage at the non-inverting input terminal independently of the state of the circuit that follows that output terminal. The output VC of the operational amplifier 27 is $VC = (VC_1 + VC_2 + VC_3 + VC_4)/4$. This is produced at the output terminal $O_1$.

As has been described above, the marginal brightness computing circuit 20 produces the mean value of the brightnesses of the marginal portions of the field of view as the voltage VC from the output terminal $O_1$.

21 of FIG. 3 is a selection circuit receptive of the output voltages VA, VB of the logarithmic compression circuits 14, 15 and the output voltage VC of the marginal brightness computing circuit 20 at input terminals $I_{21}$, $I_{22}$, $I_{23}$ respectively for computing a light value with selection of the one of two computing formulae to be described later which is determined by a control voltage corresponding to the discrimination of the fill-in flash mode inputted to a control terminal $C/\overline{A}$ from a discrimination circuit S for discriminating the fill-in flash mode. The selection circuit 21 produces a voltage $V_0$ as the light value from an output terminal $O_2$. Its construction is shown in FIG. 5.

FIG. 5 is an electrical circuit diagram of the selection circuit 21 in FIG. 3. Resistors 28, 29, 30 have the same resistance value and are to average the voltages VA, VB and BC. An inverter 31 inverts the control voltage inputted to the control terminal $C/\overline{A}$. That is, the output voltage of the inverter 31 is L level when the control voltage is H level, and becomes H level when it is L level. Analog switches 32, 33 are selectively closed to produce the mean value of the voltages VA, VB and VC or $(VA+VB+VC)/3$, and VC alone respectively depending on the control voltage of the control terminal $C/\overline{A}$. An operational amplifier 34 with its output terminal and inverting input terminal connected to each other is used as a voltage follower. The voltage at the output terminal of the operational amplifier 34 does not depend on the state of the circuit that follows that output terminal, and is equal to the voltage at the non-inverting input terminal. The output $V_0$ of the operational amplifier 34 is $V_0 = (VA + VB + VC)/3$ or $V_0 = VC$. This is produced from the output terminal $O_2$. As has been described above, the selection circuit 21 responsive to the control voltage produced from the discrimination circuit S that performs discrimination of whether the fill-in flash mode is to be set, determines which of the two computing formulae to select, and produces the corresponding output voltage $V_0$ to that computation result at the output terminal $O_2$.

The operation of the circuits of FIGS. 3 to 5 is next described.

(i) When the fill-in flash mode has not been discriminated (selected):

This case represents a situation that because the different between the brightnesses of the subject of principal photographic interest at the center of the field of view and the environment surrounding it is not too much large, a proper exposure can be given to the subject image portion as well as the environment image portion. So, with the emphasis on the brightness of the subject image portion, in order to give a proper exposure even to the environment image portion also, the exposure is determined by the average light measuring weighted on the central portion of the field of view. That is, with respect to the brightness signals VA, VB and VC of all the areas 2A, 2B and $2C_1$–$2C_4$, by the following computing equation (1), the light value $V_0$ is sought.

$$V_0 = (VA + VB + VC)/3 \ldots \quad (1)$$

In operating the circuit, at first, the discrimination circuit S for discriminating the fill-in flash mode produces a voltage of L level and the control voltage of the control terminal $C/\overline{A}$ becomes L level. Therefore, the control voltage of the analog switch 32 for passing the mean value of the voltages VA, VB and VC therethrough becomes H level by the inverter 31 and the control voltage of the analog switch 33 for passing only the voltage VC therethrough becomes L level. In this case, therefore, the output voltage $V_0$ from the operational amplifier 34 becomes $(VA + VB + VC)/3$.

(ii) When the fill-in flash mode has been discriminated (selected):

This case represents a back-lighting scene where the subject of principal photographic interest which is generally arranged at the central portion of the field of view is so largely different in brightness from its background that without flash illumination it is impossible to expose both the subject image portion of the area of the picture frame and the background image portion properly at the same time. So, for such a case, a proper exposure is given to the background image portion. As to the subject, a flash device is fired to illuminate it so as to make a proper exposure. That is, in this case, upon consideration of the brightness signal VC of the marginal areas 2C representing the brightness of the background, the light value $V_0$ is sought by the following computing equation (2):

$$V_0 = VC \ldots \quad (2)$$

In operating the circuit, at first, the voltage of H level is produced from the discrimination circuit S for the fill-in flash mode, and the control voltage of the control terminal $C/\overline{A}$ becomes H level. Therefore, the control voltage of the analog switch 32 which passes the mean value of the voltages VA, VB and VC therethrough becomes L level by the inverter 31, and the control voltage of the analog switch 33 which passes the voltage VC therethrough becomes H level. In this case, therefore, the output voltage $V_0$ from the operational amplifier 34 becomes the voltage VC alone.

Figure 6:
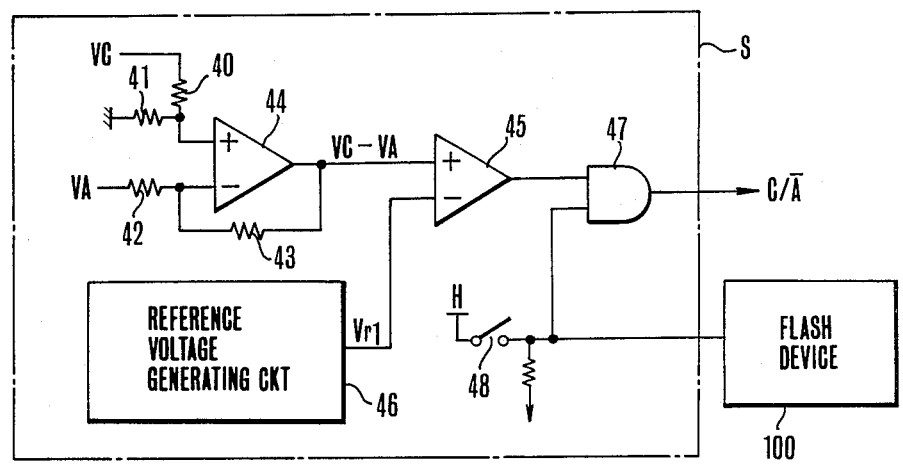
FIG. 6 is an electrical circuit diagram illustrating a first practical example of the discrimination circuit of FIG. 3.

In FIG. 6 there is shown a circuit as the first practical example of the discrimination circuit S shown in FIG. 3. In the figure, resistors 40–43 have the same resistance value and constitute together with an operational amplifier 44 a subtraction circuit for subtracting the voltage VA from the voltage VC shown in FIG. 3. A comparator 45 compares the output voltage VC-VA of the operational amplifier 44 with a reference voltage Vr1 of a reference voltage generating circuit 46 and produces an output of H level when the voltage VC-VA is larger than the reference voltage Vr1. An AND gate 47 has two inputs, one of which is connected to the output of the comparator 45, and the other of which is connected to the output of a power switch 48 for a flash (strobe) device. Therefore, when the comparator 45 produces the output of H level as the voltage VC-VA>the voltage Vr1, and when the power switch 48 for the flash device is closed, the AND gate 47 produces an output of H level. For note, this output of the AND gate 47 is connected to the control terminal $C/\overline{A}$ of the selection circuit 21 of FIG. 3. Also, 100 represents the flash device known to those skilled in the art. When the power switch 48 is closed, the flash device 100 is rendered operative to be able to emit flash light.

The discriminating condition for the fill-in flash mode of the discrimination circuit S shown in FIG. 6 is that the magnitude by which the the brightness output voltage VA of the central portion of the field of view in which the subject of principal photographic interest lies is larger than the brightness output voltage VC of the margin of the field of view is larger than the prescribed value (the voltage Vr1), in other words, the difference between the voltage VC and the voltage VA is larger than the prescribed value (Vr1), and that the photographer desires to fire the flash device. That is, in case when the the central area of the field of view is of low brightness, and is so largely different in brightness from the environmental area, or back lighting is so intense, that, without the use of flash illumination, it is difficult to give a proper exposure to both of the central and marginal areas, the photographer turns on the electrical power source of the flash device, as he has intended to make a flash exposure for the subject of principal interest in the central area. By detecting the making of this decision of his, that discrimination is carried out.

Figure 7:
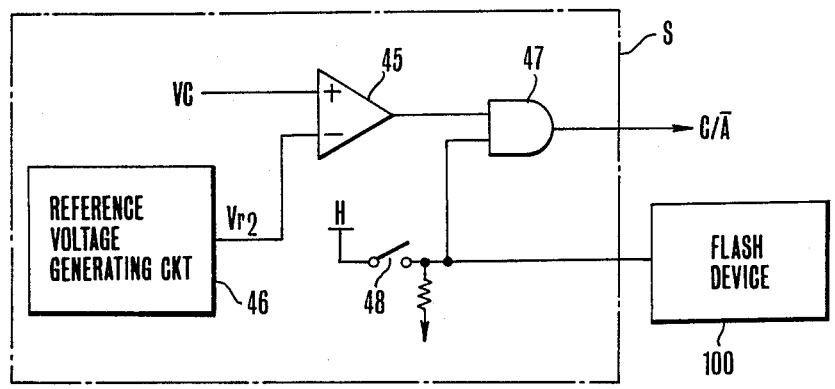
FIG. 7 is an electrical circuit diagram illustrating a second practical example of the discrimination circuit of FIG. 3.

In FIG. 7, there is shown a circuit as the second practical example of the discrimination circuit S shown in FIG. 3. This or second practical example of FIG. 7 is almost similar in construction to the first practical example of FIG. 6. Therefore, the same reference characters are used to denote the similar parts. The difference of this or second practical example of FIG. 7 from the above-described first practical example of FIG. 6 is that the non-inverting input terminal of the comparator 45 is directly supplied with the output voltage VC representing the brightness of the margin of the field of view. This comparator 45 compares that output voltage VC with a reference voltage Vr2 and produces an output of H level when the voltage VC>the voltage Vr2.

Therefore, the discriminating condition for the fill-in flash mode of the discrimination circuit S shown in FIG. 7 is that despite the brightness level of the marginal area of the field of view being relatively high so that there is no need to use flash illumination, the photographer desires a flash exposure. This state is defined as the fill-in flash mode. For note, in this case, determination is made on assumption that the brightness level of the central area is so low as to necessitate flash illumination.

For note, though not shown in the figure, if the camera body or the flash device is provided with a manually operable fill-in flash mode selection switch, this selection switch may be connected to the control terminal $C/\overline{A}$ of the selection circuit 21 of FIG. 3.

In the light measuring device of the above-described embodiment, what is characteristic is that on assumption that the subject of principal photographic interest exists in the central portion (the area 2A or the area 2B) of the area of the field of view, when the fill-in flash mode has been discriminated (selected), light measuring can be carried out in order to give a proper exposure to the environment portion in such a manner that it is not influenced by the brightness of the subject which is of low brightness.

For note, though, in the above-described embodiment, the central portion of the field of view is divided into two areas of 2A and 2B, it may be made only one area, of course. Conversely, it may be more finely divided into three or more areas. Also, though, in the above-described embodiment, the area of the marginal portion of the field of view is divided into four sub-areas in order to accurately grasp the situation of the margin of the field of view, it may be simplified to only one area (by connecting the four sub-areas to one), as a matter of course. Conversely, the marginal portion of the field of view may be divided to a larger number of sub-areas. Also, though, in the above-described embodiment, the brightness signals of the central area of the field of view and the marginal area of the field of view are merely averaged when the fill-in flash mode has not been discriminated (selected), it is also possible to apply an exposure correction automatically by utilizing the difference between the brightness signals of the subject portion and the environmental portion. Also, a marginal brightness computing circuit may be provided for seeking a more proper exposure by utilizing the difference between the brightness signals of the adjacent two of the sub-areas of the marginal portion of the field of view even when the fill-in flash mode has been selected.

Also, though, in the above-described embodiment, the output signals VA and VB representing the brightnesses of the two areas 2A and 2B of the central portion of the field of view have been ignored when th fill-in flash mode has been discriminated (selected), if the central area 2A becomes larger, and the marginal area 2C becomes conversely smaller, the brightness output signal VA only may otherwise be ignored when in the fill-in flash mode, so that the light value is computed based on the brightness output signals VB and VC. In other words, the central area of the field of view to be ignored when in the fill-in flash mode may arbitrarily be determined depending on the size of each light measuring areas of the center.

For note, the present invention is applicable not only to single lens reflex cameras but also well to lens shutter cameras. For note, though the selection circuit and the discrimination circuit of the embodiment of the invention have been constructed in the form of logic circuits, it is to be understood, as a matter of course, that a software-based treatment of it by using a microcomputer falls in the scope and spirit of the invention.

As has been described above, the present invention makes it possible to provide a light measuring device capable, upon discrimation of the fill-in flash mode, of giving a proper exposure even to the environmental portion without suffering from the influence of the brightness and size of the subject of principal photographic interest positioned at the central portion of the field of view.

What is claimed is:

1. A light measuring device for a camera, the camera being settable in a fill-in flash mode in which a flash is set and used to illuminate the subject being photographed, the fill-in flash mode being useable where there is a difference between the brightness of the subject being photographed in the center of the field of view of the camera and the background of the subject outside such central area of the field of view, the light measuring device comprising:
   (a) light receiving means having a plurality of light receiving portions for receiving the light from and developing a brightness value for each of at least two areas into which the field of view of the camera is divided, including a central area located at the center of the field of view and an outer area located outside said central area;
   (b) discriminating means for discriminating whether or not the camera has been set in the fill-in flash mode; and
   (c) computing means including a measuring light value computing circuit for developing a light value in accordance with a computation formula which includes at least one of the plurality of brightness values developed by said light receiving means, said computing means performing the light value computation without the brightness value developed by said light receiving means for at least said central area when the setting of the camera in the fill-in flash mode has been discriminated by said discriminating means.

2. A device according to claim 1, wherein when the brightness value developed by said light receiving means for said outer area is larger than the brightness value developed by said light receiving means for said central area beyond a prescribed level, and when a flash unit is set in a state of being able to fire, said discriminating means discriminates that the camera has been set in the fill-in flash mode.

3. A device in accordance with claim 1, wherein when the brightness value developed by said light receiving means for said outer area is larger than a prescribed level and when a flash unit is set in a state of being able to fire, said discriminating means discriminates that the camera has been set in said fill-in flash mode.

4. A device according to claim 1, wherein said outer area is further divided into a plurality of sub-areas.

5. A device according to claim 4, wherein the brightness value developed by said light receiving means for said outer area is the mean value of the brightness values developed by said light receiving means for all of said plurality of sub-areas.

* * * * *